United States Patent [19]
Sasaki et al.

[11] Patent Number: 5,498,496
[45] Date of Patent: Mar. 12, 1996

[54] LEAD ACID BATTERY

[75] Inventors: Masaaki Sasaki; Tohru Horii; Masahiro Arakawa; Kazuo Murata, all of Takatsuki, Japan

[73] Assignee: Yuasa Corporation, Osaka, Japan

[21] Appl. No.: 355,907

[22] Filed: Dec. 14, 1994

[30]     Foreign Application Priority Data

Dec. 14, 1993  [JP]  Japan .................................. 5-313092
Jan. 27, 1994  [JP]  Japan .................................. 6-007398

[51] Int. Cl.$^6$ .................................................... H01M 4/14
[52] U.S. Cl. .......................... 429/233; 429/236; 429/238; 429/241
[58] Field of Search ................................. 429/233, 238, 429/241, 236, 246

[56]                References Cited

U.S. PATENT DOCUMENTS

| 4,589,999 | 5/1986 | Vasta ............................... 252/511 |
| 4,684,583 | 8/1987 | Klinedinst et al. ............... 429/48 |
| 5,139,902 | 8/1992 | Drews et al. ..................... 429/234 |

*Primary Examiner*—Prince Willis, Jr.
*Assistant Examiner*—Richard H. Lilley, Jr.
*Attorney, Agent, or Firm*—Evenson, McKeown, Edwards & Lenahan

[57]               ABSTRACT

A battery of this invention is equipped with a positive electrode having a following structure. A resin sheet is bonded to one side or both sides of a metal sheet, a large number of through holes are made at least on the resin sheet, and an active material is filled in the through holes.

9 Claims, 4 Drawing Sheets

LEAD ACID BATTERY

BACKGROUND OF THE INVENTION

This invention relates to a positive electrode of a lead acid battery, especially of a valve regulated type lead acid battery.

Conventionally, an electrode for lead acid battery has so far been classified roughly into two types: a tubular (clad) type and a paste type. The tubular type electrode has a structure composed of a core metal made of lead alloy, a cylindrical tube made by weaving a corrosion resistant glass fiber, and an active material retained by the tube, and has been used mainly for a positive electrode of a long-life battery. The paste type electrode has a sheet-shaped structure in which an active material is retained in a grid made of lead alloy, and has been used mainly for a negative electrode and a positive electrode for a battery excellent in high-rate characteristic and of low price.

In recent years, demands for a high energy density and a long service life have been increasing remarkably in a valve regulated type lead acid battery. However, since there has been a limitation for the high energy density to be in compatible with the long service life in the electrode of the above-mentioned type, the demands have not fully been satisfied. Namely, in the tubular type electrode, the active material is prevented from falling down even when the core metal is corroded because the active material is retained by the cylindrical tube made by weaving the glass fiber. Therefore, the service life is prolonged but the high-rate discharge characteristic is low because a reaction surface area of the electrode is not large, so that a high energy density can not be obtained. While, in the paste type electrode, the high-rate discharge characteristic is high because a reaction surface area becomes large owing to the sheet-shaped form so that a high energy density can be obtained. However, when the grid is corroded to change its shape, a contact of the grid with the active material can not be maintained and falling-off of the active material takes place, so that the long service life can not be accomplished.

SUMMARY OF THE INVENTION

An object of this invention is to provide a lead acid battery equipped with a positive electrode having a high energy density and a long service life.

This invention provides a lead acid battery equipped with a positive electrode comprising an acid-resistant and oxidation-resistant resin sheet, a current collecting metal sheet, and an active material; the resin sheet and the metal sheet are laminated each other, a plurality of through holes are made at least on the resin sheet, and the active material is filled in the through holes.

According to the positive electrode having the above structure, the active material is retained by the through holes of the resin sheet so that the active material is prevented from falling off even when the metal sheet is corroded. In addition, since a portion of the metal sheet covered by the resin sheet is hard to be corroded, the corrosion of the metal sheet scarcely occurs. Consequently, the falling-off of the active material scarcely takes place to provide a long service life. Since the electrode is the sheet-shaped type prepared by laminating the resin sheet and the metal sheet, the reaction surface area serving for the electrode is large so that its high-rate discharge characteristic becomes large and a high energy density can be obtained.

In the positive electrode having the above structure, the following structures (1) to (8) may be adopted.

(1) All the through holes of the resin sheet have the identical diameter and distribute uniformly.

According to the structure (1), the electrode can be manufactured easily so as to improve a productivity.

(2) The through holes of the resin sheet located in the vicinity of a current collecting lug of the metal sheet have diameters smaller than those of the through holes located at another portions.

Since a portion in the vicinity of the current collecting lug of the metal sheet has a small resistance, an active material of the resin sheet located in the vicinity of it is ready to react as compared with the active materials located at another portions. Therefore, the portion in the vicinity of the current collecting lug of the metal sheet is apt to be corroded as compared with the another portions. For this reason, there has been a possibility of decrease in a current collecting ability of the metal sheet to cause an early exhaustion of service life of the positive electrode. According to the structure (2), however, the through holes of the resin sheet located in the vicinity of the current collecting lug of the metal sheet have small diameters, so that the reaction of the active material in the vicinity of it can be restricted and the corrosion of the portion in the vicinity of the current collecting lug of the metal sheet can be controlled. Consequently, the decrease in the current collecting ability of the metal sheet can be prevented and the positive electrode can be provided with a further long service life. FIG. 1 is a diagram showing a relation between the diameter of the through hole and a reactivity of the active material. The axis of abscissa represents the diameter of through hole and the axis of ordinate represents a practical capacity divided by theoretical capacity multiplied by 100. It can be seen that a small diameter of the through hole results in a low reactivity of the active material.

(3) All the through holes of the resin sheet have the identical diameter. A distribution density of the through holes located in the vicinity of the current collecting lug of the metal sheet is made smaller than a distribution density of the through holes located at another portions.

Even in the above structure (3), the reaction of the active material in the vicinity of the current collecting lug can be restricted and the corrosion of the portion in the vicinity of the current collecting lug of the metal sheet can be controlled, in the same way as the structure (2). Consequently, the decrease in the current collecting ability of the metal sheet can be prevented and the positive electrode can be provided with a further long service life.

(4) A large number of through holes are made on the metal sheet too. The through holes of the metal sheet connect to the through holes of the resin sheet respectively, and a diameter of the through holes of the metal sheet is smaller than or equal to a diameter of the through holes of the resin sheet. The active material is filled in the through holes of metal sheet too.

According to the above structure (4), the active material is filled in the through holes of the metal sheet too, so that a quantity of the active material per unit volume of the positive electrode becomes large. Consequently, the high-rate discharge characteristic can be improved and a further higher energy density can be obtained.

(5) The metal sheet is a copper sheet a surface of which is coated with lead or lead alloy.

Generally, the lead or lead alloy is used for a current collector of electrode for the lead acid battery. According to the above structure (5), the copper which is light in weight and excellent in conductivity as compared with the lead and lead alloy, is used for the metal sheet i.e. the current collector, so that the high-rate discharge characteristic can be improved and a further higher energy density can be obtained.

(6) The resin sheet is placed on one side of the metal sheet, and the other side of the metal sheet is coated with resin.

According to the above structure (6), when the quantity of the active material is fixed at constant, a thickness of the resin sheet can be made large as compared with the case where the resin sheets are placed on both sides of the metal sheet. For this reason, a time required for reaction of the entire active material can be prolonged so that the service life can be made longer. Since the other side of the metal sheet is coated with resin, its corrosion can be prevented.

(7) The resin sheets are placed on both sides of the metal sheet.

According to the above structure (7), the both sides of the metal sheet are prevented from being corroded.

(8) The resin sheet is bonded to the metal sheet.

According to the above structure (8), an ingress of electrolyte in between the resin sheet and the metal sheet can be prevented so that the metal sheet can be prevented positively from being corroded.

DETAILED DESCRIPTION OF THE INVENTION

Embodiment 1

Figure 1:
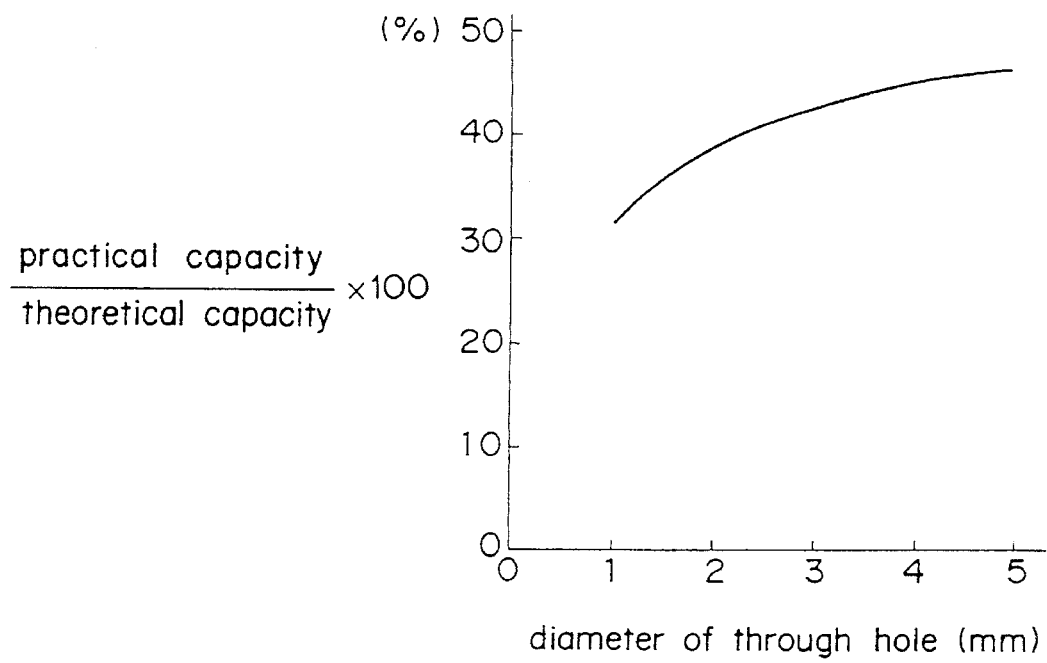
FIG. 1 is a diagram showing a relation between a diameter of through hole and a reactivity of active material.
Figure 2:
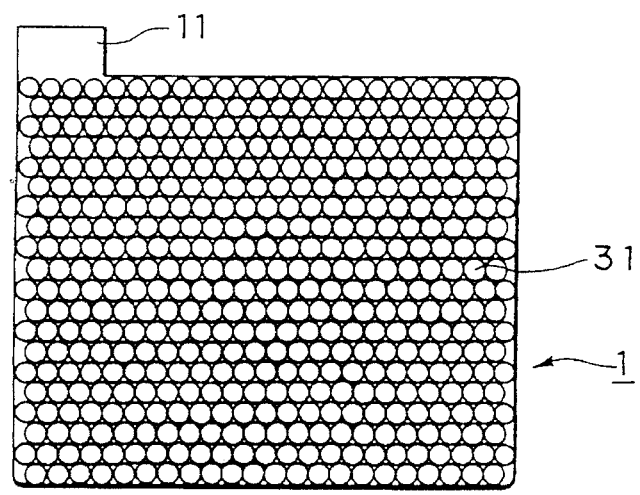
FIG. 2 is a front view of a positive electrode of embodiment 1.
Figure 3:
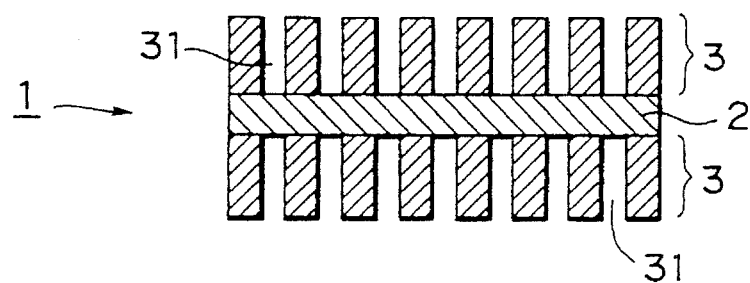
FIG. 3 is a cross sectional view of the positive electrode of embodiment 1.

FIG. 2 is the front view of a positive electrode of this embodiment and FIG. 3 is the cross sectional view of the same. A positive electrode 1 of this embodiment comprises a metal sheet 2, a resin sheet 3 and an active material (not shown). The metal sheet 2 is made of a lead alloy and has a thickness of 0.1 mm. The resin sheet 3 is made of a polyolefin-based synthetic resin and has a thickness of 0.2 mm. The resin sheets 3 are bonded to both sides of the metal sheet 2 by means of a bonding agent. A large number of through holes 31 are made on the resin sheet 3. The through hole 31 has a circular cross section with a diameter of 2.7 mm and a pore ratio of 62% and is distributed uniformly. The active material is filled in the through hole 31. The positive electrode 1 has a width of 8 cm and a length of 12 cm.

The positive electrode 1 was combined with a separator comprising a fine glass fiber mat and having a thickness of 0.55 mm and a paste type negative electrode having a width and a length same with those of the positive electrode 1 and a thickness of 0.35 mm, so that they formed one set. 19 sets were connected with same poles faced each other, so as to compose one cell. Six cells were connected in series to be housed in a case made of ABS and an electrolyte was filled in these cells, and subjected to the first charging, so that a valve regulated type lead acid battery of 24 Ah, 12 V was fabricated. Sizes of this battery were 12.8 cm in width, 17.1 cm in length and 10.8 cm in height, and its weight was 5.6 kg.

Embodiment 2

Figure 4:
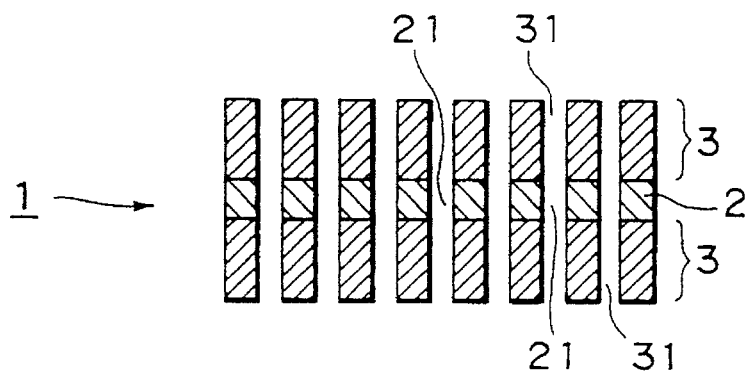
FIG. 4 is a cross sectional view of a positive electrode of embodiment 2.

FIG. 4 is the cross sectional view of a positive electrode of this embodiment and the front view is the same with FIG. 2. The positive electrode 1 of this embodiment is basically different from the positive electrode 1 of embodiment 1 in the point that a large number of through holes 21 are made even on the metal sheet 2, and the active material (not shown) is filled even in the through hole 21.

The metal sheet 2 is made of a lead alloy and has a thickness of 0.1 mm. The resin sheet 3 is made of a polyolefin-based synthetic resin and has a thickness of 0.2 mm. The resin sheets 3 are bonded to both sides of the metal sheet 2 by means of a bonding agent. A large number of through holes 31 are made on the resin sheet 3. The through hole 31 has a circular cross section with a diameter of 3.0 mm and a pore ratio of 77%, and is distributed uniformly. A large number of through holes 21 are made even on the metal sheet 2. The through hole 21 has a circular cross section with a diameter of 3.0 mm, and each through hole 21 is so formed as to connect to the corresponding through hole 31. The active material is filled in the through hole 31 and the through hole 21. The positive electrode 1 has a width of 8 cm and a length of 12 cm.

The positive electrode 1 was combined with a separator comprising a fine glass fiber mat and having a thickness of 0.6 mm and a paste type negative electrode having a width and a length same with those of the positive electrode 1 and a thickness of 0.43 mm, so that they formed one set. 17 sets were connected with same poles faced each other, so as to compose one cell. Six cells were connected in series to be housed in a case made of ABS and an electrolyte was filled in these cells, and subjected to the first charging, so that a valve regulated type lead acid battery of 25 Ah, 12 V was fabricated. Sizes of this battery were 12.8 cm in width, 16.6 cm in length and 10.8 cm in height, and its weight was 5.5 kg.

Embodiment 3

Figure 5:
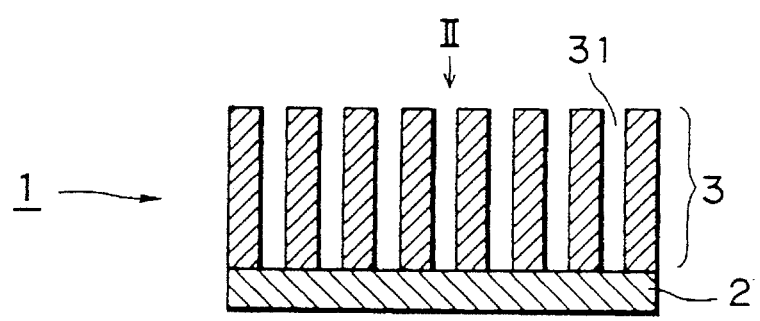
FIG. 5 is a cross sectional view of a positive electrode of embodiment 3.

FIG. 5 is the cross sectional view of a positive electrode of this embodiment and a view viewed in an arrow II of FIG. 5 is same with FIG. 2. The positive electrode 1 of this embodiment is basically different from the positive electrode 1 of embodiment 1 in the point that the resin sheet 3 is placed on only one side of the metal sheet 2, and the resin sheet 3 is thick.

The metal sheet 2 is made of a lead alloy and has a thickness of 0.1 mm. The resin sheet 3 is made of a polyolefin-based synthetic resin and has a thickness of 0.4 mm. The resin sheet 3 is bonded to only one side of the metal sheet 2 by means of a bonding agent, and the other side of the metal sheet 2 is coated with thin resin. A large number of through holes 31 are made on the resin sheet 3. The through hole 31 has a circular cross section with a diameter of 2.7 mm and a pore ratio of 62%, and is distributed uniformly. The active material (not shown) is filled in the through hole 31. The positive electrode 1 has a width of 8 cm and a length of 12 cm.

The positive electrode 1 was combined with a separator comprising a fine glass fiber mat and having a thickness of 0.55 mm and a paste type negative electrode having a width and a length same with those of the positive electrode 1 and a thickness of 0.35 mm, so that they formed one set. 19 sets were connected with same poles faced each other, so as to compose one cell. Six cells were connected in series to be housed in a case made of ABS and an electrolyte was filled in these cells, and subjected to the first charging, so that a valve regulated type lead acid battery of 22 Ah, 12 V was fabricated. Sizes of this battery were 12.8 cm in width, 17.1 cm in length and 10.8 cm in height, and its weight was 5.7 kg.

Embodiment 4

Figure 6:
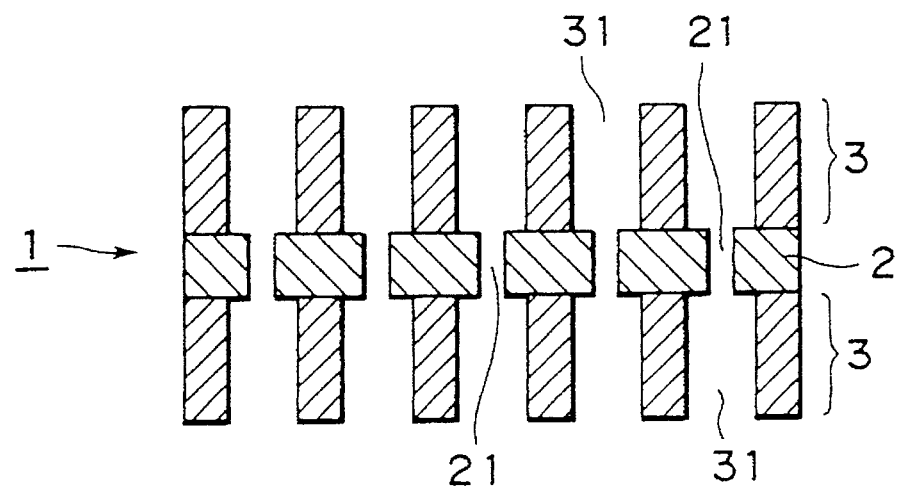
FIG. 6 is a cross sectional view of a positive electrode of embodiment 4.

FIG. 6 is the cross sectional view of a positive electrode of this embodiment and the front view is the same with FIG. 2. The positive electrode 1 of this embodiment is basically different from the positive electrode 1 of embodiment 1 in the point that a diameter of the through hole 21 made on the metal sheet 2 is small, and the through hole 31 has a square cross section.

The metal sheet 2 is made of a lead alloy and has a thickness of 0.1 mm. The resin sheet 3 is made of a polyolefin-based synthetic resin and has a thickness of 0.2 mm. The resin sheets 3 are bonded to both sides of the metal sheet 2 by means of a bonding agent. A large number of through holes 31 are made on the resin sheet 3. The through hole 31 has a square cross section with a side length of 2.4 mm and a pore ratio of 77%, and is distributed uniformly. A large number of through holes 21 are made even on the metal sheet 2. The through hole 21 has a circular cross section with a diameter of 1.5 mm, and each through hole 21 is so formed as to connect to a corresponding through hole 31. The active material is filled in the through hole 31 and the through hole 21. The positive electrode 1 has a width of 8 cm and a length of 12 cm.

The positive electrode 1 was combined with a separator comprising a fine glass fiber mat and having a thickness of 0.55 mm and a paste type negative electrode having a width and a length same with those of the positive electrode 1 and a thickness of 0.35 mm, so that they formed one set. 19 sets were connected with same poles faced each other, so as to compose one cell. Six cells were connected in series to be housed in a case made of ABS and an electrolyte was filled in these cells, and subjected to the first charging, so that a valve regulated type lead acid battery of 24 Ah, 12 V was fabricated. Sizes of this battery were 12.8 cm in width, 17.1 cm in length and 10.8 cm in height, and its weight was 5.6 kg.

Embodiment 5

A basic structure of the positive electrode 1 of this embodiment is same with the positive electrode 1 of embodiment 1. The metal sheet 2 is made of a lead alloy and has a thickness of 0.1 mm. The resin sheet 3 is made of a polyolefin-based synthetic resin and has a thickness of 0.2 mm. The resin sheets 3 are bonded to both sides of the metal sheet 2 by means of a bonding agent. A large number of through holes 31 are made on the resin sheet 3. The through hole 31 has a circular cross section with a diameter of 3.0 mm and a pore ratio of 77%, and is distributed uniformly. The active material is filled in the through hole 31. The positive electrode 1 has a width of 8 cm and a length of 12 cm.

The positive electrode 1 was combined with a separator comprising a fine glass fiber mat and having a thickness of 0.6 mm and a paste type negative electrode having a width and a length same with those of the positive electrode 1 and a thickness of 0.43 mm, so that they formed one set. 17 sets were connected with same poles faced each other, so as to compose one cell. Six cells were connected in series to be housed in a case made of ABS and an electrolyte was filled in these cells, and subjected to the first charging, so that a valve regulated type lead acid battery of 25 Ah, 12 V was fabricated. Sizes of this battery were 12.8 cm in width, 16.6 cm in length and 10.8 cm in height, and its weight was 5.9 kg.

Embodiment 6

Figure 7:
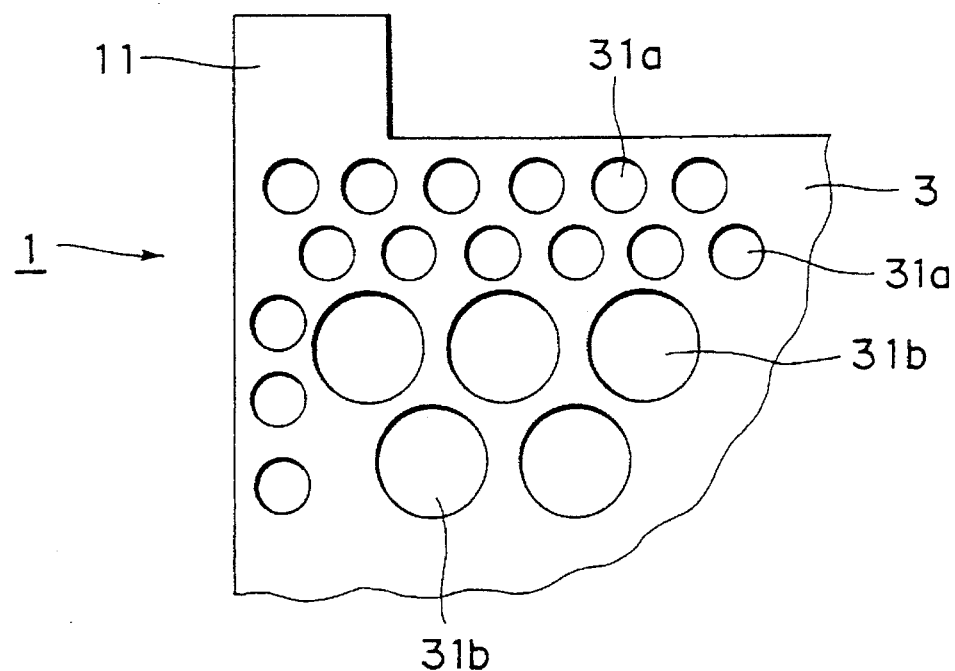
FIG. 7 is a partially enlarged front view of a positive electrode of embodiment 6.

FIG. 7 is the partially enlarged front view of the positive electrode 1 of this embodiment. 11 is a current collecting lug. The positive electrode 1 of this embodiment is basically different from the positive electrode 1 of embodiment 1 in the point that a diameter of the through hole 31 located in the vicinity of the lug 11 is smaller than a diameter of the through hole 31 located at another portions.

The metal sheet 2 is made of a lead alloy and has a thickness of 0.1 mm. The resin sheet 3 is made of a ABS-based synthetic resin and has a thickness of 0.2 mm. The resin sheets 3 are bonded to both sides of the metal sheet 2 by means of a bonding agent. A large number of through holes 31 are made on the resin sheet 3. A through hole 31a, among the through hole 31, located in the vicinity of the lug 11 has a circular cross section with a diameter of 2.0 mm and a through hole 31b located at another portion has a circular cross section with a diameter of 4.0 mm. The through hole 31 has a pore ratio of 77%. The active material (not shown) is filled in the through hole 31. The positive electrode 1 has a width of 8 cm and a length of 12 cm.

The positive electrode 1 was combined with a separator comprising a fine glass fiber mat and having a thickness of 0.6 mm and a paste type negative electrode having a width and a length same with those of the positive electrode 1 and a thickness of 0.43 mm, so that they formed one set. 17 sets were connected with same poles faced each other, so as to compose one cell. Six cells were connected in series to be housed in a case made of ABS and an electrolyte was filled in these cells, and subjected to the first charging, so that a valve regulated type lead acid battery of 25 Ah, 12 V was fabricated. Sizes of this battery were 12.8 cm in width, 16.6 cm in length and 10.8 cm in height, and its weight was 5.9 kg.

Embodiment 7

Figure 8:
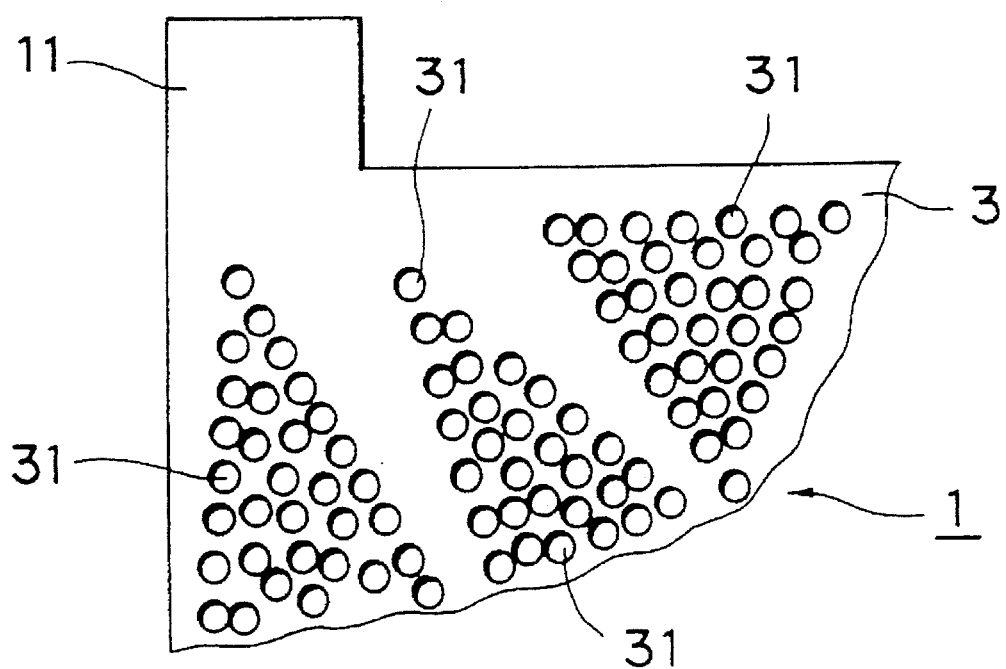
FIG. 8 is a partially enlarged front view of a positive electrode of embodiment 7.

FIG. 8 is the partially enlarged front view of the positive electrode 1 of this embodiment. The positive electrode 1 of this embodiment is basically different from the positive electrode 1 of embodiment 1 in the point that a distribution density of the through hole 31 located in the vicinity of the lug 11 is smaller than a distribution density of the through hole 31 located at another portion, and a through hole 21 having a smaller diameter than that of the through hole 31 is made on the metal sheet 2.

The metal sheet 2 is made of a lead alloy and has a thickness of 0.1 mm. The resin sheet 3 is made of a polyolefin-based synthetic resin and has a thickness of 0.2 mm. The resin sheets 3 are bonded to both sides of the metal sheet 2 by means of a bonding agent. A large number of through holes 31 are made on the resin sheet 3. The through hole 31 has a circular cross section with a diameter of 3.0 mm. The through hole 31 has a pore ratio of 64%, and is so distributed that a distribution density of the through hole 31 located in the vicinity of the lug 11 is smaller than a distribution density of the through hole 31 located at another portion. A large number of through holes 21 are made even on the metal sheet 2. The through hole 21 has a circular cross section with a diameter of 1.0 mm and is so formed as to connect to the corresponding through hole 31. The active material (not shown) is filled in the through hole 31 and the through hole 21. The positive electrode 1 has a width of 8 cm and a length of 12 cm.

The positive electrode 1 was combined with a separator comprising a fine glass fiber mat and having a thickness of 0.6 mm and a paste type negative electrode having a width and a length same with those of the positive electrode 1 and a thickness of 0.43 mm, so that they formed one set. 17 sets were connected with same poles faced each other, so as to compose one cell. Six cells were connected in series to be housed in a case made of ABS and an electrolyte was filled in these cells, and subjected to the first charging, so that a valve regulated type lead acid battery of 23 Ah, 12 V was fabricated. Sizes of this battery were 12.8 cm in width, 16.6 cm in length and 10.8 cm in height, and its weight was 5.6 kg.

Embodiment 8

The positive electrode 1 of this embodiment is same with the positive electrode 1 of the embodiment 6 and different from it only in the point that a copper sheet coated with lead alloy is used for the metal sheet 2. A lead acid battery made up had performances of 25 Ah and 12 V, and its weight was 5.5 kg.

Embodiment 9

The positive electrode 1 of this embodiment is same with the positive electrode 1 of the embodiment 7 and different from it only in the point that a copper sheet coated with lead alloy is used for the metal sheet 2. A lead acid battery made up had performances of 23 Ah and 12 V, and its weight was 5.2 kg.

Comparison Example 1

An opened-type lead acid battery with specifications of 140 Ah and 6 V was made up by using a tubular type positive electrode.

Comparison Example 2

An valve regulated type lead acid battery with specifications of 24 Ah and 12 V was made up by using a paste type positive electrode. A thickness of the positive electrode was 1.3 mm.

Test

The lead acid batteries made up in the embodiments 1 to 9 and the comparison examples 1 and 2 were investigated in terms of discharge energy densities and cycle lives. Results are listed in Table 1.

The discharge energy density was calculated from a battery weight and a battery capacity obtained after the battery was discharged down to an end voltage of 1.75 V/cell with a discharge current of 5 hour-rate at 25° C. The cycle life was obtained as a cycle number required for the battery to reach 80% of its initial capacity after repeating charge/discharge cycles at 40° C., provided that discharging was carried out for three hours with a current of 0.25 C (C: 5 hour-rate capacity) and charging was carried out up to 110% of discharge amount.

TABLE 1

| Battery | Discharge energy density (Wh/kg) | Cycle life (Cycle number) |
| --- | --- | --- |
| Embodiment 1 | 51 | 1100 |
| Embodiment 2 | 55 | 1000 |
| Embodiment 3 | 46 | 1200 |
| Embodiment 4 | 51 | 900 |
| Embodiment 5 | 51 | 1000 |
| Embodiment 6 | 51 | 1400 |
| Embodiment 7 | 49 | 1600 |
| Embodiment 8 | 55 | 1300 |
| Embodiment 9 | 53 | 1500 |
| Comparison example 1 | 32 | 1250 |
| Comparison example 2 | 39 | 200 |

The followings can be understood from Table 1.

The reason why the discharge energy densities of batteries of embodiments 1 to 9 are larger than that of battery of comparison example 2, is that thicknesses of the positive electrodes of embodiments 1 to 9 are by far smaller than that of positive electrode of comparison example 2, so that reaction surface areas of the positive electrodes are large. In the paste type positive electrode of comparison example 2, early corrosion of positive electrode current collector will take place when the thickness of positive electrode is made smaller than a present thickness, so that a service life is shortened remarkably to impede putting the battery into practical use. Therefore, there has been a limitation in improvement of discharge energy density. In the positive electrodes of embodiments 1 to 9, however, the corrosion of the metal sheet 2 is restricted in its portion covered by the resin sheet 3, so that the positive electrode can be reduced in its thickness without paying attention to the deterioration of service life property due to the corrosion. Therefore, it became possible to improve the discharge energy density remarkably.

The reason why the cycle life of battery of embodiment 1 is longer than that of the embodiment 2 is that a volume of the metal sheet 2 is large.

The reason why the cycle life of battery of embodiment 3 is longer than those of the embodiments 1 and 2 is that a time required for reaction of the active material becomes long because a thickness of one layer of the active material is large.

The reason why the cycle life of battery of embodiment 4 is shorter than that of the embodiment 1 is that, because of the square shape of the through hole 31, it can be considered that not only a stress created by a volume change of the active material according to charge/discharge becomes not uniform but a combined force between the active materials becomes weak.

The reason why the cycle lives of batteries of embodiments 6 and 7 are longer than those of batteries of embodiment 1 to 5, is that the reaction of the active material located in the vicinity of the lug 11 is restricted and the corrosion of the metal sheet 2 in the vicinity of it is restricted.

The reason why the discharge energy densities of batteries of embodiments 8 and 9 are larger than those of batteries of embodiments 6 and 7, is that the copper having a better conductivity and smaller weight than the lead and lead alloy is used for the metal sheet 2.

In the above-mentioned embodiments, a retained state of the active material becomes worse when the diameter of the through hole 31 is enlarged up to 10 mm or larger. When the diameter is minimized to 1 mm or smaller, a distance between the through hole 31 becomes 0.1 mm or smaller in order to secure a desired porous rate so that disadvantages such as the corrosion of the metal sheet 2 etc. will arise due to the above causes. Therefore, the diameter is to be preferably 2 to 3 mm as in the above embodiments.

It is desirable to connect the metal sheet 2 to the resin sheet 3 by means of the bonding agent, however, a mechanical connecting means may be used.

What is claimed is:

1. A lead acid battery equipped with a positive electrode comprising an acid-resistant and oxidation-resistant resin sheet, a current collecting metal sheet, and an active material;

the resin sheet and the metal sheet are laminated each other, a plurality of through holes are made at least on the resin sheet, and the active material is filled in the through holes.

2. A lead acid battery as set forth in claim 1, in which all the through holes of the resin sheet have the identical diameter and distribute uniformly.

3. A lead acid battery as set forth in claim 1, in which through holes of the resin sheet located in the vicinity of a current collecting lug of the metal sheet have diameters smaller than those of through holes located at another portions.

4. A lead acid battery as set forth in claim 1, in which all the through holes of the resin sheet have the identical diameter, and a distribution density of through holes located in the vicinity of current collector lug of the metal sheet is made smaller than a distribution density of through holes located at another portions.

5. A lead acid battery as set forth in claim 1, in which a plurality of through holes are made even on the metal sheet, the through holes of the metal sheet connect to the through holes of the resin sheet respectively, a diameter of the through hole of the metal sheet is smaller than or equal to a diameter of the connected through hole of the resin sheet, and the active material is filled even in the through holes of metal sheet.

6. A lead acid battery as set forth in claim 1, in which the metal sheet is a copper sheet a surface of which is coated with lead or lead alloy.

7. A lead acid battery as set forth in claim 1, in which the resin sheet is placed on one side of the metal sheet, and the other side of the metal sheet is coated with resin.

8. A lead acid battery as set forth in claim 1, in which the resin sheets are placed on both sides of the metal sheet.

9. A lead acid battery as set forth in claim 1, in which the resin sheet is bonded to the metal sheet.

* * * * *